(12) United States Patent
Warmolts et al.

(10) Patent No.: US 7,784,234 B2
(45) Date of Patent: Aug. 31, 2010

(54) FIRE STOP CLAMP

(75) Inventors: Jeffrey Warmolts, Glen Ellyn, IL (US); Sigismund Paul, Hanover, IL (US)

(73) Assignee: Cooper Technologies Company, Houston, TX (US)

( * ) Notice: Subject to any disclaimer, the term of this patent is extended or adjusted under 35 U.S.C. 154(b) by 1113 days.

(21) Appl. No.: 11/343,982

(22) Filed: Jan. 31, 2006

(65) Prior Publication Data

US 2007/0193141 A1    Aug. 23, 2007

(51) Int. Cl.
  *E04B 1/94* (2006.01)
(52) U.S. Cl. ........................................ 52/317; 52/220.8
(58) Field of Classification Search .................. 52/219, 52/573.1, 1, 317, 220.8, 232, 171.2; 137/79
  See application file for complete search history.

(56) References Cited

U.S. PATENT DOCUMENTS

| | | | |
|---|---|---|---|
| 713,537 A | 11/1902 | Treadwell | |
| 1,494,234 A | 5/1924 | Gossett | |
| 1,710,060 A * | 4/1929 | Metcalf, Jr. | 285/149.1 |
| 2,800,850 A * | 7/1957 | McKann | 454/3 |
| 3,052,065 A * | 9/1962 | Rettman | 52/27 |
| 3,105,664 A | 10/1963 | Poradun | |
| 3,678,634 A * | 7/1972 | Wise et al. | 52/1 |
| 4,150,848 A * | 4/1979 | Dyrup | 285/238 |
| 4,407,023 A | 10/1983 | Norton | |
| 4,488,566 A * | 12/1984 | Hicks | 137/74 |
| 4,630,415 A | 12/1986 | Attwell | |
| 4,659,868 A | 4/1987 | Sala | |
| 4,788,800 A * | 12/1988 | Whiteley | 52/1 |
| 4,796,401 A * | 1/1989 | Wexler | 52/232 |
| 4,848,043 A * | 7/1989 | Harbeke | 52/1 |
| 4,901,488 A * | 2/1990 | Murota et al. | 52/232 |
| 4,974,623 A * | 12/1990 | Sturgis | 137/74 |
| 5,120,009 A | 6/1992 | Sasin | |
| 5,155,957 A | 10/1992 | Robertson et al. | |
| 5,183,070 A * | 2/1993 | Cornwall | 137/75 |
| 5,253,455 A * | 10/1993 | Cross | 52/1 |
| 5,257,641 A | 11/1993 | Elsbury et al. | |
| 5,301,475 A | 4/1994 | Stefely | |
| 5,331,946 A * | 7/1994 | Yamini et al. | 126/314 |
| 5,421,127 A * | 6/1995 | Stefely | 52/1 |
| 5,452,551 A * | 9/1995 | Charland et al. | 52/232 |
| 5,548,934 A * | 8/1996 | Israelson | 52/220.8 |
| 5,702,218 A | 12/1997 | Onofrio | |
| 5,727,762 A * | 3/1998 | Cosentino | 248/231.61 |
| 5,887,396 A * | 3/1999 | Thoreson | 52/232 |
| 5,898,987 A | 5/1999 | Onofrio | |
| 5,953,872 A * | 9/1999 | MacMillian et al. | 52/220.8 |
| 7,010,889 B1 | 3/2006 | Renfro | |
| 7,051,695 B1 | 5/2006 | Kowis | |

(Continued)

*Primary Examiner*—Richard E Chilcot, Jr.
*Assistant Examiner*—James Ference
(74) *Attorney, Agent, or Firm*—Senniger Powers LLP

(57) ABSTRACT

A fire stop clamp is presented. The fire stop clamp includes a support clamp and a fire stop disc. The support clamp supports a pipe by preventing movement of a pipe towards a structural member. The fire stop disc seals an opening associated with a pipe penetration. The sealed opening inhibits the passage of fire and smoke through the opening. The fire stop clamp includes an expansion element that pushes the fire stop disc towards the structural member. If a pipe moves away from the structural member, the expansion element will allow the fire stop disc to retain a seal over the opening.

20 Claims, 4 Drawing Sheets

U.S. PATENT DOCUMENTS

| | | | |
|---|---|---|---|
| 2003/0024185 A1* | 2/2003 | Menzies | 52/219 |
| 2004/0100040 A1 | 5/2004 | Sakno | |
| 2004/0168398 A1* | 9/2004 | Sakno et al. | 52/741.4 |
| 2004/0238031 A1* | 12/2004 | Lee | 137/74 |

* cited by examiner

FIRE STOP CLAMP

FIELD

The present invention relates generally to the field of mechanical supports for pipe penetrations and more particularly a fire stop that supports a pipe and inhibits the passage of smoke and fire through a penetration.

BACKGROUND

In modern building construction, state, county, and local building codes contain strict requirements relating to fire stopping measures. Most building codes, for example, require a specific fire-rating for walls and floors within a building. The fire-rating insures that if a fire occurs in one region of a building, it will be contained within that region for a time associated with the fire-rating.

Another building code requirement is that pipe or conduit penetrations through a fire barrier, such as a ceiling or wall, need to be sealed to restore the rating of the fire barrier. Typically, a contractor will fill theses openings with a backer material (polyethylene, polyurethane, or mineral wool) and seal the opening with a special caulk marketed for this purpose. This caulk and backer system of sealing pipe penetrations, however, has many drawbacks. For example, during construction, caulk and backer systems frequently wash out. Pipe movement (horizontal and vertical) due to internal pressurization, thermal expansion, thermal elongation, or seismic forces causes corruption of a sealed opening. A thin film or bead of caulk would not be able to withstand the stress created by a pipe moving from one side of an opening to the other, or from pipe elongation or movement perpendicular to the opening. Additionally, caulk and backer systems have high installation costs and are manual labor intensive. Therefore, a fire stop clamp, that supports a pipe and inhibits the passage of smoke and fire through a pipe penetration, is presented.

SUMMARY

A fire stop clamp is presented. The fire stop clamp supports a vertical or horizontal pipe that passes through a structural member. The fire stop clamp supports a pipe by preventing movement toward the structural member. Additionally, the weight associated with a vertically mounted pipe may be distributed, via the fire stop clamp, to a structural member. The fire stop clamp includes a fire stop disc, or plate, that seals, and therefore inhibits the passage of fire and smoke through an opening. The diameter of the fire stop clamp disc may be determined so that pipe movement is prevented from corrupting the seal of the opening.

In another example, the fire stop clamp includes a spring as an expandable element which is coupled to a support collar and the fire stop disc. The spring pushes the fire stop disc towards the opening, allowing the opening to remain sealed when a pipe moves away from the opening due to internal pressurization, thermal expansion, thermal elongation, or other external forces. The fire stop disc may include a retention pin, tube, or cylinder for guiding the expansion of the spring.

In yet another example, the fire stop clamp includes overlapping tubes or cylinders filled with expandable carbon as the expandable element. Instead of carbon other suitable expandable materials may also be used to expand the expandable element when exposed to heat. The overlapping cylinders are coupled to the support collar and to the fire stop disk. When exposed to heat, the expandable material expands and pushes the fire stop disk towards the opening, allowing the opening to remain sealed when a pipe moves away from the opening. The overlapping cylinders may also include a spring to provide an expansion element at lower temperatures.

In an even further example, the fire stop clamp includes a removable clip. When the removable clip is removed, the expandable element engages the fire stop disc and allows it to be pushed towards the opening. The removable clip may be constructed from a fusible element, so that when the removable clip is heated above a melting temperature associated with the fusible element, the spring engages the fire stop disc.

These as well as other aspects and advantages will become apparent to those of ordinary skill in the art by reading the following detailed description, with reference where appropriate to the accompanying drawings. Further, it is understood that this summary is merely an example and is not intended to limit the scope of the claims.

BRIEF DESCRIPTION OF THE DRAWINGS

Certain examples are described below in conjunction with the appended drawing figures, wherein like reference numerals refer to like elements in the various figures, and wherein.

DETAILED DESCRIPTION

A fire stop clamp for supporting a pipe and inhibiting the passage of smoke and fire through a pipe penetration is presented. The fire stop clamp includes support collars (or a support clamp) and a fire stop disc (or plate). The support clamp prevents pipe movement towards a structural member. The fire stop disc seals the opening associated with a pipe penetration.

Figure 1A:
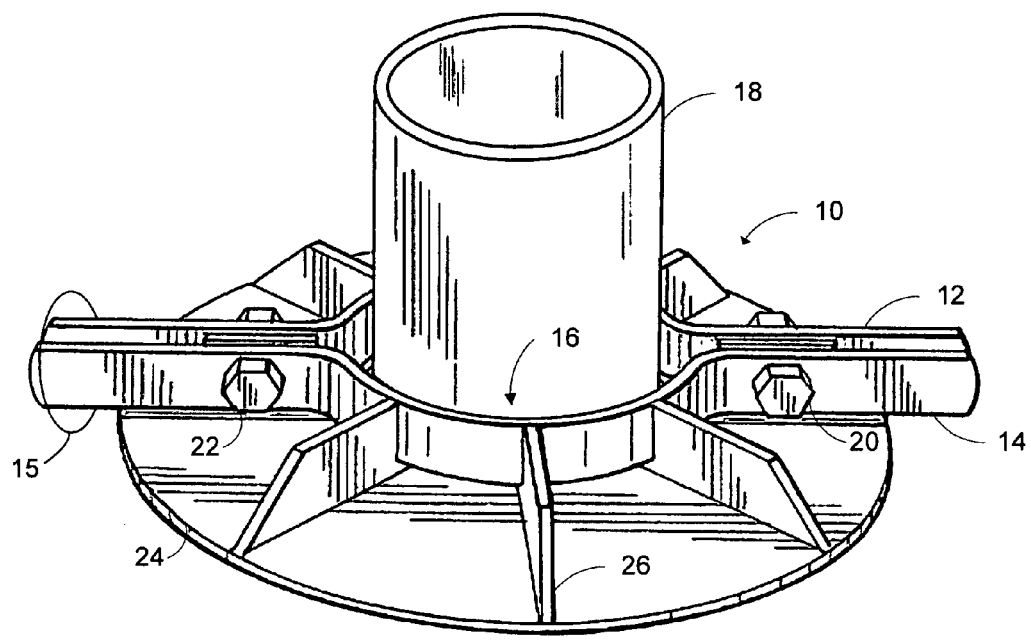
FIG. 1a is pictorial drawing of a fire stop clamp.

Turning now to FIG. 1a, an example fire stop clamp 10 is illustrated. Fire stop clamp 10 includes support collars 12 and 14. Support collars 12 and 14 form a support clamp 15. Each support collar 12 and 14 includes a radial portion, such as radial portion 16, which fits snugly around a pipe 18. The support collars also include clamping (or linear) portions that are used to tighten the support clamp to pipe 18 via fasteners 20 and 22. The fasteners 20 and 22 in the example of FIG. 1a are bolts. In other examples, however, the fasteners 20 and 22 are not limited to being bolts. Welded rivets, for example, may be used as fasteners.

The support clamp 15 is mounted to a fire stop disc 24. The fire stop disc 24 has an inside diameter (or radius) that fits snugly around pipe 18. The outside diameter (or radius) of the fire stop disc 24 should be large enough to cover the opening of a pipe penetration. The support clamp in FIG. 1a includes stiffners, such as stiffener 26, which may be used to distribute a force associated with pipe movement across the fire stop disc 24 and consequently the structural member. If pipe 18 is a vertical pipe, the support clamp and stiffener 26 may distribute a weight associated with the plate to the fire stop disc 24. Depending on the type of pipe (e.g., sprinkler riser, electrical conduit, etc.), the stiffner 26 may or may not be included. Additionally, the clamping portions of the support collars 12 and 14 of the support clamp 15 are shown as extending beyond the outside diameter of the fire stop disc 24. If more support is required, the extension of the clamping portions beyond the outside diameter of the fire stop disc 24 may be increased.

Figure 1B:
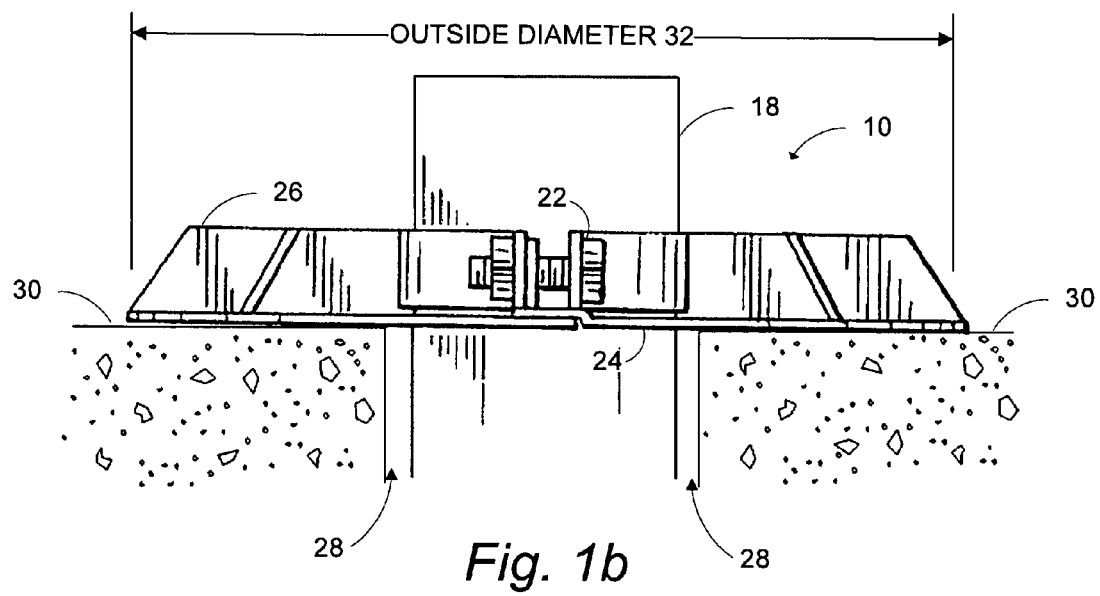
FIG. 1b is pictorial drawing illustrating a cross-sectional view of a fire stop clamp.

A cross sectional view of fire stop clamp 10 passing through an opening 28 in a floor 30 is illustrated in FIG. 1*b*. The outside diameter 32 of the fire stop disc 24 is larger than the diameter of the opening 28. In FIG. 1*b*, the opening 28 is sealed by the fire stop disc 24. The outside diameter 32 should be made large enough to cover the opening 28. In addition, the outside diameter 32 may be designed to compensate for pipe movement. Such as pipe movement that may occur during a fire or other high temperature exposure, for example. To compensate for pipe movement, the outside diameter 32 may be made large enough to retain a seal of the opening 28 even if the pipe were to move from one side of the opening 28 to the other side.

Often times, however, when pipes are pressurized, or exposed to high temperatures, they may expand and elongate and can cause the fire stop clamp 10 to move away from a floor or other structural member. If this occurs, the opening 28 may allow smoke and fire to pass through the opening 28.

Figure 2A:
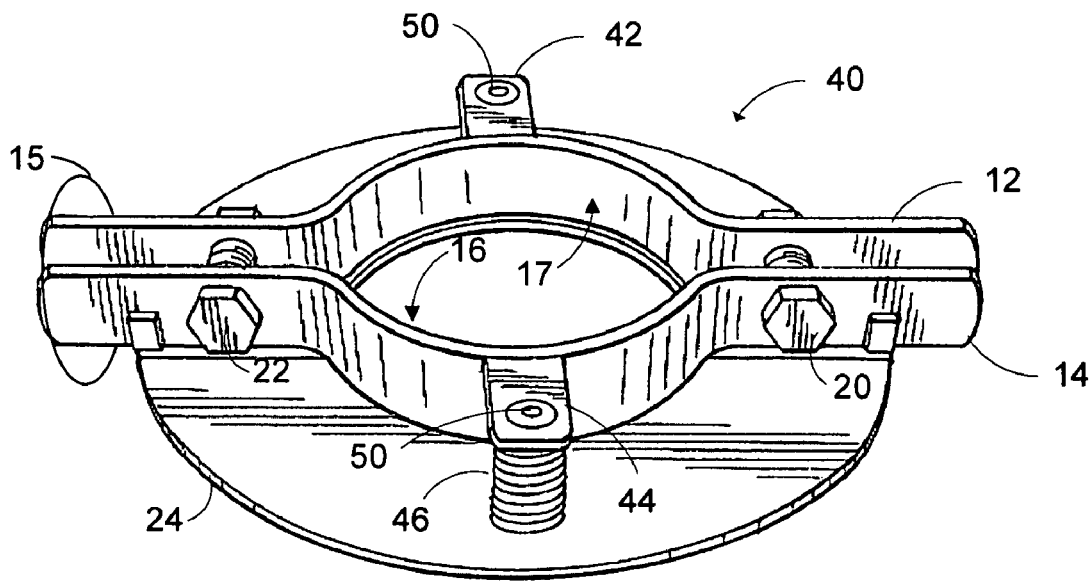
FIG. 2a is a pictorial drawing of another fire stop clamp.

Fire stop clamp 40, presented in FIG. 2*a*, prevents an opening from being exposed when a pipe moves away from a floor or other structural member. The fire stop clamp 40 includes supports collars 12 and 14 (support clamp 15), fasteners 20 and 22, and fire stop disc 24. The support collars 12 and 14 include radial portions 16 and 17 as well as clamping portions. Fasteners 20 and 22 may be coupled with the clamping portions to tighten the support clamp 15. In addition, fire stop clamp 40 includes tabs 42 and 44 which are each used to couple an expansion element, such as spring 46, in between the fire stop disc 24 and the support clamp 15.

Figure 2B:
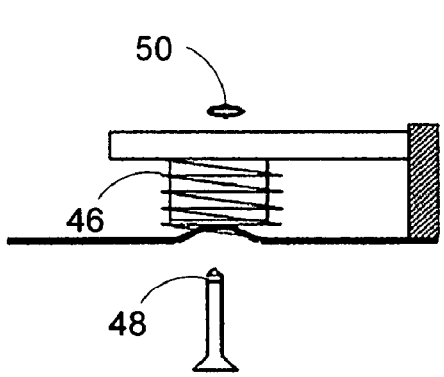
FIG. 2b is a pictorial drawing of a spring coupled to a fire stop disc and a support collar.

FIG. 2*b* is a cross-sectional view of spring 46. Spring 46 has a retention pin 48 located inside of it. The retention pin 48 is used to guide the expansion of spring 46. Other springs, or expansion elements used in the fire stop clamp 40 may also include a retention pin.

Also included in the fire stop 40 is a removable clip 50. In the event of a fire, a removable clip, or multiple removable clips, may engage the expansion element of the fire stop clamp 40. The removable clip 50 may be made of a fusible element having a melting temperature associated with it. When the removable clip 50 is heated above its melting temperature (i.e., a fire), it will melt and the support clamp 15 will release from the fire stop disc 24. For example, in FIG. 2*b*, if the removable clip 50 melts, the support collars 12 and 14 will release and they will no longer be attached to the fire stop disc 24.

Figure 2C:
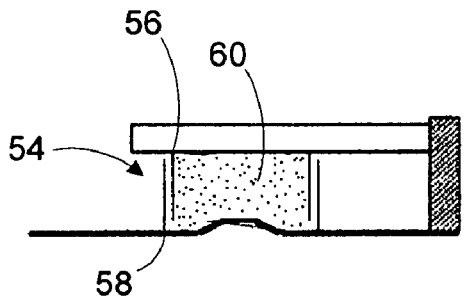
FIG. 2c is a pictorial drawing of an expansion element that includes an expandable material.

Instead of a spring, other types of expandable elements may be used to maintain a seal in between the fire stop disc 24 and an opening. FIG. 2*c* illustrates another such expandable element 54. Expandable element 54 includes cylinder 56, which is mounted perpendicularly to support collar 15 and cylinder 58 which is mounted perpendicularly to fire stop disc 24. Cylinders 56 and 58 may be filled with an expandable material such as expandable carbon 60 (or graphite). At temperatures above 300° F., the expandable carbon 60 will begin to expand and push the fire stop disc towards an opening. Cylinders 56 and 58 may be used to guide the expansion of the expandable element 54. For carbon based expandable materials, 300° F. may be viewed as a predetermined threshold for which expansion will occur. Other suitable expandable materials may also be used and are not limited to be only carbon.

Figure 2D:
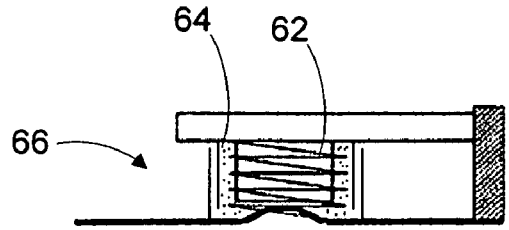
FIG. 2d is a pictorial drawing of an expansion element that includes an expandable material and a spring.

Alternatively, both a spring 62 and an expandable material 64 may be used to create expandable element 66, as shown if FIG. 2*d*. The spring 62, which may begin to lose strength at temperatures above 350° F. (a steel spring for example), may push the fire stop disc 24 towards an opening in a first temperature range (i.e., temperatures less than 350° F.). The expandable material 64 may be used to push the fire stop disc 24 towards an opening in a second temperature range (i.e., temperatures greater than 300° F.).

Figure 3A:
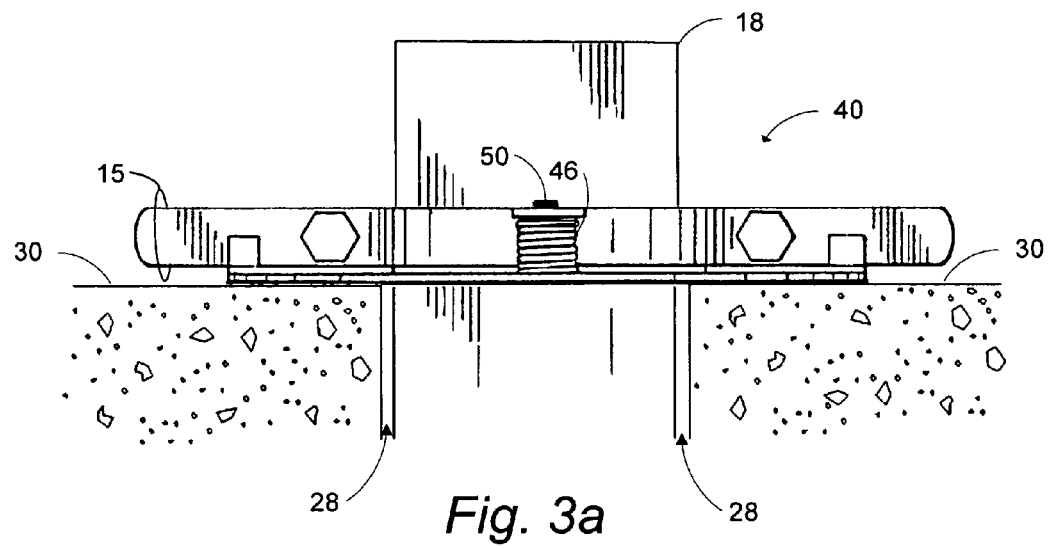
FIG. 3a is a pictorial drawing illustrating a cross-sectional view of a fire stop clamp having compressed springs.
Figure 3B:
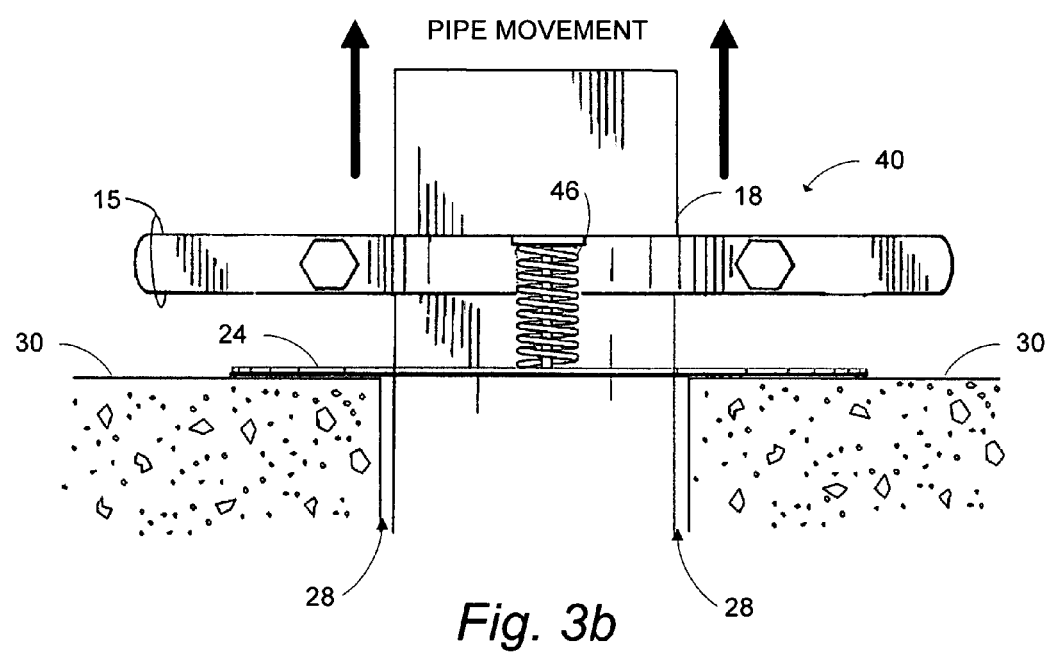
FIG. 3b is a pictorial drawing illustrating a cross-sectional view of a fire stop clamp having expanded springs.

FIG. 3*a* illustrates fire stop clamp 40 tightened to pipe 18 via support clamp 15. Removable clip 50 maintains the compression of spring 46. In FIG. 3*b*, pipe 18 moves away from the opening 28 (or floor 30). Removable clip 50 is removed, by being disengaged or melting, and spring 46 expands. Fire stop disc 24 is pushed, via spring 46, toward the opening 28. Thus, opening 28 remains sealed despite the movement of pipe 18.

Although a spring is illustrated in the above examples of FIGS. 3*a* and 3*b*, fire stop clamp 40 may include the other expansion elements as described above. Other expansion elements such as a cantilever spring fingers may also be used, for example. The above examples are not limited to the type of expansion element. The fire stop clamp 40 may also include multiple expansion elements attached to the support clamps and fire stop discs.

Figure 4A:
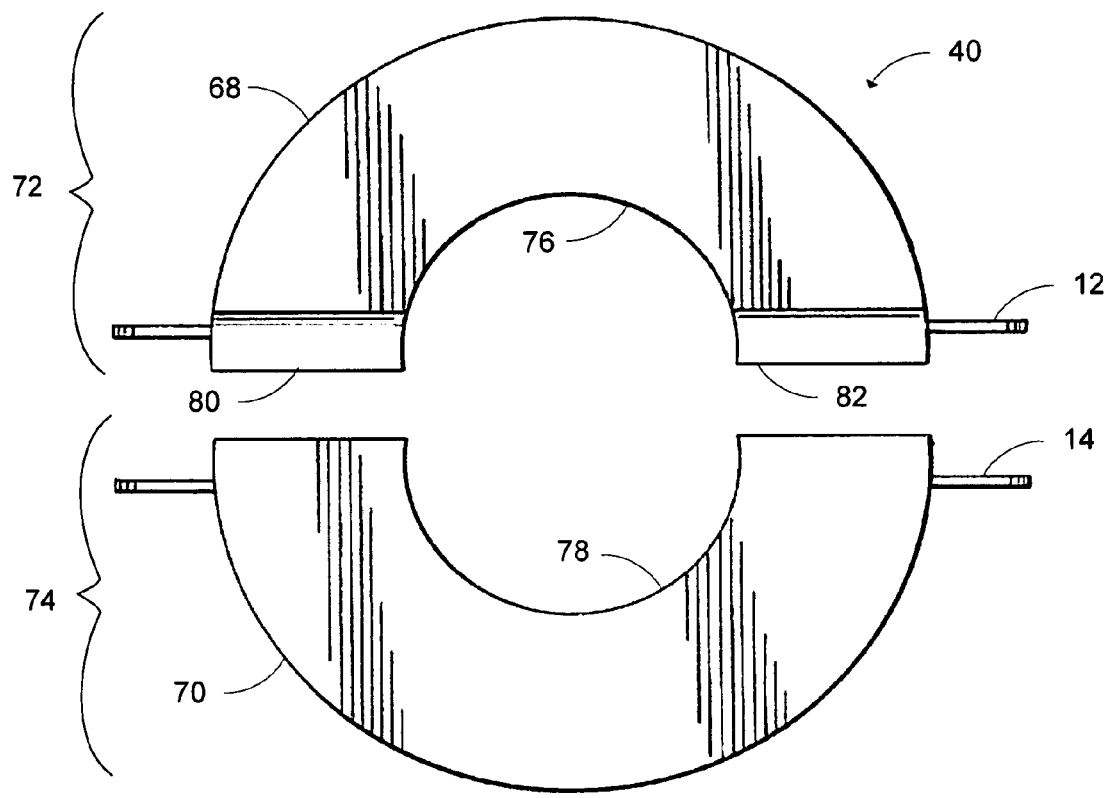
FIG. 4a is a pictorial drawing of a bottom view of a fire stop clamp.

In order to mount the above fire stop clamps to a pipe, the fire stop disc may include two half disc plates. A bottom view of fire stop clamp 40 illustrating half disc plates 68 and 70 is shown in FIG. 4*a*. Both half disc plates 68 and 70 form the fire stop disc. Each half disc has a support collar coupled to it via at least one spring and removable clips. A half disc plate and support collar, when coupled together, may be viewed as a spring loaded collar. Support collar 12 and half disc plate 68 form spring loaded collar 72. Support collar 14 and half disc plate 70 form spring loaded collar 74.

Figure 4B:
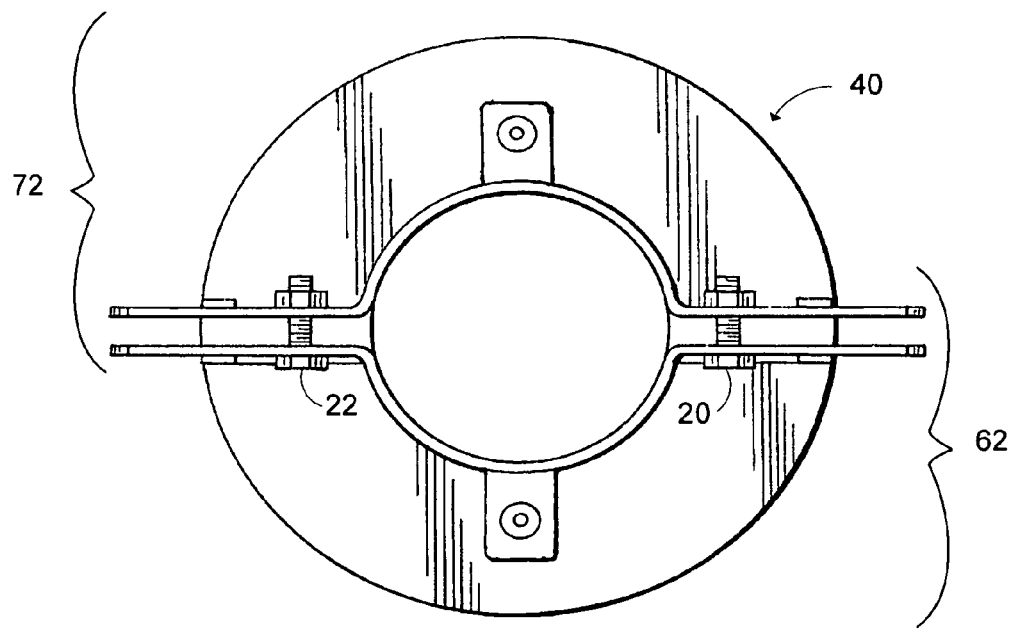
FIG. 4b is a pictorial drawing of a top view of a fire stop clamp.

Each spring loaded collar may be designed to fit a desired pipe radius. Spring loaded collars 72 and 74, for example, have respective interior radiuses 76 and 78 that correspond to a pipe's radius. Once the radius has been chosen, spring loaded collars 72 and 74 may be clamped around a pipe. Spring loaded collar 72 includes locking tabs 80 and 82 which may be used with fasteners 20 and 22 to lock spring loaded collars 72 and 74 together. The locking tabs 80 and 82 overlap half disc plate 70. The overlap of half disc plate 70 allows the fire stop disc to completely seal an opening. Additionally, as described above, the exterior diameter of the fire stop disc should be determined so that pipe movement will not corrupt the seal of an opening through a structural member. A top view of fire stop clamp 40, illustrated in FIG. 4*b*, shows spring loaded collars 72 and 74 locked together by fasteners 20 and 22.

Overall, the above examples describe a fire stop clamp. The fire stop clamp includes a fire stop disc and a support clamp. The fire stop disc and support clamp may be manufactured out of a variety of metallic alloys or other fire resistant materials. Additionally the fire stop disc and support clamp may comprise individual components such as half disc plates, supports collars, fasteners, removable clips, expandable elements, etc., which may be used to mount the fire stop clamp to a pipe and insure the fire stop disc retains a seal around an opening associated with a pipe penetration. It should be understood that the illustrated examples are examples only and should not be taken as limiting the scope of the present invention. The claims should not be read as limited to the described order or elements unless stated to that effect. Therefore, all examples that come within the scope and spirit of the following claims and equivalents thereto are claimed as the invention.

We claim:

1. A fire stop clamp for supporting a pipe and sealing an opening through a structural member through which the pipe passes, comprising a support clamp coupled to a fire stop in a manner which permits relative movement between the support clamp and the fire stop in a direction generally parallel to the pipe, the support clamp having a first inside diameter sized for fitting around the pipe and being configured to be tightened to prevent the pipe from moving toward the structural member, and the fire stop having a second inside diameter sized for fitting around the pipe and an outside diameter sized for sealing the opening, thereby inhibiting the passage of fire and smoke through the opening, the support clamp and fire stop being coupled such that the fire stop remains in place sealing the opening around the pipe upon movement of the pipe and support clamp member away from the structural member in said direction generally parallel to the pipe.

2. The fire stop clamp as in claim 1, wherein the fire stop has no fastener openings for fastening the fire stop to said structural member, and wherein the outside diameter of the fire stop is determined so that the sealing of the opening is not corrupted during lateral movement of the pipe in the opening.

3. The fire stop clamp as in claim 1, wherein the support clamp is coupled to the fire stop by an elongate stiffener having a length extending in a generally radial direction with respect to said first inside diameter, the stiffener distributing movement and weight associated with the pipe to the fire stop.

4. The fire stop clamp as in claim 1, wherein the support clamp is coupled to the fire stop by an expansion element, the expansion element, in operation, pushing the fire stop towards the structural member when the support clamp moves away from the structural member, thereby allowing the opening to remain sealed.

5. The fire stop clamp as in claim 4, wherein the support clamp moves away from the structural member for reasons selected from the group consisting of internal pressurization, thermal expansion, thermal elongation, and seismic forces.

6. The fire stop clamp as in claim 4, wherein the expansion element is a spring arranged to exert a force generally parallel to the pipe.

7. The fire stop clamp as in claim 4, wherein the expansion element comprises a first cylinder perpendicularly mounted to the support clamp, a second cylinder perpendicularly mounted to the fire stop disc that overlaps the first cylinder, and an expandable material located inside the first and second cylinders, the expandable material expanding when exposed to heat above a predetermined threshold.

8. The fire stop clamp as in claim 4, wherein the support clamp is further coupled to the fire stop by a removable clip, the removable clip, when removed, allowing the expansion element to push the fire stop.

9. The fire stop claim as in claim 8, wherein the removable clip is constructed from a fusible element, the removable clip allowing the expansion element to push the fire stop when the removable clip is heated above a melting temperature associated with the fusible element.

10. A fire stop clamp for supporting a pipe and sealing an opening through a structural member through which the pipe passes, comprising:

first and second support collars each having a radial portion and first and second clamping portions, the radial portion having a radius sized for fining the pipe;

first and second half plates each having an inside radius sized for fitting the pipe, the first and second half plates forming a fire stop that is sized for completely sealing the opening around the pipe; and an expansion element coupling at least one of the first and second support collars and the fire stop and allowing relative movement between the at least one of the first and second support collars and the fire stop in a direction generally parallel to the pipe, the expansion element being expandable in said direction generally parallel to the pipe to maintain the fire stop in a position sealing the opening around the pipe in the event the first and second support collars move with the pipe away from the structural member.

11. The fire stop clamp as in claim 10, wherein the expansion element is a spring arranged to exert a force generally parallel to the pipe.

12. The fire stop clamp as in claim 10, wherein the expansion element is expansible to push the fire stop away from said at least one of the first and second support collars.

13. The fire stop clamp as in claim 10, wherein the expansion element comprises a first cylinder perpendicularly mounted to at least one of the first and second support collars, the first cylinder filled with an expandable material that expands proportionally to the amount of heat that the expandable material is exposed to over a first temperature range.

14. The fire stop clamp as in claim 13, wherein the expandable material is expandable carbon.

15. The fire stop clamp as in claim 13, wherein the fire stop disc comprises a second cylinder perpendicularly mounted thereto, the second cylinder overlapping the first cylinder, thereby guiding expansion associated with the expansion element.

16. The fire stop clamp as in claim 13, wherein the expansion element further includes a spring for pushing fire stop disc towards the structural member in a second temperature range, the expandable material for pushing the fire stop disc towards the structural member in the first temperature range.

17. A fire stop clamp for supporting a pipe and sealing an opening through a structural member through which the pipe passes, comprising:

a first spring loaded collar comprising a first support collar coupled, via a first spring, to a first half plate for permitting relative movement between the first spring loaded collar and the first half plate in a direction generally parallel to the pipe, the first support collar and first half plate each having an inside radius sized for fitting the pipe, and the first half plate having an outside radius covering a first portion of the opening; and a second spring loaded collar comprising a second support collar coupled, via a second spring, to a second half plate for permitting relative movement between the second spring loaded collar and the second half plate in a direction generally parallel to the pipe, the second support collar and second half plate each having an inside radius sized for fitting the pipe; the first and second springs being expandable in a direction generally parallel to the pipe to maintain the half plates in a position sealing the opening around the pipe in the event the first and second support collars move with the pipe away from the opening.

18. The fire stop clamp as in claim 17, wherein the first and second support collars each further comprise a tab extending in a generally radial direction with respect to said inside radius of the support collar, each tab being located above the respective first and second half plates, the first spring being coupled to the tab of the first support collar and the first half plate, and the second spring being coupled to the tab of the second support collar and the second half plate.

19. The fire stop claim as in claim 18, wherein the first and second half plates each further comprise respective first and second retention pins mounted on a surface of the first and second half plates, the first and second retention pins respectively being located inside the first and second springs.

20. The fire stop clamp as in claim 19, wherein the first and second support collars are each further coupled to the first and second half plates by a removable clip, the removable clip of the first and second supports, when removed, allowing the spring to push the first and second half plates towards the structural member.

* * * * *